(12) United States Patent
Koski et al.

(10) Patent No.: US 7,522,372 B2
(45) Date of Patent: Apr. 21, 2009

(54) SERVO TRACK HAVING PERIODIC FRAMES OF TONE FIELD AND EMBEDDED SYNCHRONIZATION MARKS

(75) Inventors: John A. Koski, Lafayette, CO (US); Timothy C. Hughes, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 11/602,872

(22) Filed: Nov. 20, 2006

(65) Prior Publication Data

US 2007/0070545 A1 Mar. 29, 2007

Related U.S. Application Data

(62) Division of application No. 10/854,078, filed on May 24, 2004, now Pat. No. 7,158,338.

(51) Int. Cl.
   *G11B 5/584* (2006.01)
(52) U.S. Cl. .................. 360/77.12; 360/48; 360/51; 360/77.13; 360/77.14
(58) Field of Classification Search ................ None
   See application file for complete search history.

(56) References Cited

U.S. PATENT DOCUMENTS

| | | | |
|---|---|---|---|
| 3,845,500 A * | 10/1974 | Hart | .................. 360/77.13 |
| 4,616,275 A | 10/1986 | Peeters | |
| 5,371,638 A | 12/1994 | Saliba | |
| 5,384,671 A | 1/1995 | Fisher | |
| 5,389,671 A | 2/1995 | Felman et al. | |
| 5,452,165 A | 9/1995 | Chen et al. | |
| 5,576,906 A | 11/1996 | Fisher et al. | |

(Continued)

FOREIGN PATENT DOCUMENTS

EP 0 690 442 A2 1/1996

(Continued)

OTHER PUBLICATIONS

Abramovitch, D. Y. et al. (Jun. 1998). "Customizable Coherent Servo Demodulation for Disk Drives," *Proceedings of the American Control Conference* Philadelphia, PA, Jun. 24-26, 1998, 5:3043-3049.

(Continued)

*Primary Examiner*—Hoa T Nguyen
*Assistant Examiner*—Dismery E Mercedes
(74) *Attorney, Agent, or Firm*—Morrison & Foerster LLP

(57) ABSTRACT

Methods and systems for sensing a position of a transducer head with respect to a storage medium. One method includes generating a read signal from a servo track stored on a magnetic storage medium. The servo track includes servo frames of magnetic flux transitions forming detectable servo marks, the servo marks forming a tone field of repeating servo marks oriented at a first azimuth angle and a mid-frame synchronization mark incorporated within the tone field, wherein the tone field provides a metric reference for dimensional measurements between features within the servo frame(s). The number of servo marks in the tone field of each servo frame along a longitudinal direction of the servo track before the mid-frame synchronization mark and after the mid-frame synchronization mark varies with lateral position.

26 Claims, 11 Drawing Sheets

U.S. PATENT DOCUMENTS

| | | | |
|---|---|---|---|
| 5,689,384 A | | 11/1997 | Albrecht et al. |
| 5,898,533 A | * | 4/1999 | Mantey et al. ............... 360/48 |
| 5,903,404 A | | 5/1999 | Tsurumi et al. |
| 5,930,065 A | | 7/1999 | Albrecht et al. |
| 5,995,306 A | | 11/1999 | Contreras et al. |
| 6,018,434 A | | 1/2000 | Saliba |
| 6,021,013 A | * | 2/2000 | Albrecht et al. ............... 360/53 |
| 6,023,386 A | | 2/2000 | Reed et al. |
| 6,031,671 A | | 2/2000 | Ayres |
| 6,108,159 A | | 8/2000 | Nute et al. |
| 6,111,719 A | | 8/2000 | Fasen |
| 6,239,939 B1 | | 5/2001 | Bui et al. |
| 6,246,535 B1 | | 6/2001 | Saliba et al. |
| 6,266,204 B1 | | 7/2001 | Nonoyama |
| 6,282,051 B1 | | 8/2001 | Albrecht et al. |
| 6,320,719 B1 | * | 11/2001 | Albrecht et al. ......... 360/77.12 |
| 6,327,105 B1 | | 12/2001 | DeForest |
| 6,462,904 B1 | | 10/2002 | Albrecht et al. |
| 6,498,695 B2 | | 12/2002 | Kosugi |
| 6,512,651 B1 | * | 1/2003 | Eifert et al. ............ 360/77.13 |
| 6,542,325 B1 | * | 4/2003 | Molstad et al. ......... 360/77.12 |
| 6,580,581 B1 | | 6/2003 | Bui et al. |
| 6,657,802 B1 | | 12/2003 | Ashley et al. |
| 6,710,967 B2 | | 3/2004 | Hennecken et al. |
| 6,721,126 B1 | | 4/2004 | Bui et al. |
| 6,762,900 B2 | | 7/2004 | Bui et al. |
| 6,775,092 B2 | | 8/2004 | Zweighaft et al. |
| 6,781,778 B1 | * | 8/2004 | Molstad et al. ............... 360/48 |
| 6,839,196 B2 | | 1/2005 | Trivedi |
| 6,842,305 B2 | | 1/2005 | Molstad et al. |
| 6,865,050 B2 | | 3/2005 | Nakao et al. |
| 6,879,457 B2 | * | 4/2005 | Eaton et al. ............... 360/75 |
| 6,912,104 B2 | | 6/2005 | Trabert et al. |
| 6,999,258 B2 | | 2/2006 | Molstad et al. |
| 7,002,763 B2 | * | 2/2006 | Bui et al. ............... 360/48 |
| 7,035,040 B2 | * | 4/2006 | Molstad et al. ......... 360/77.12 |
| 7,038,872 B2 | * | 5/2006 | Yip et al. ............... 360/48 |
| 7,085,095 B2 | | 8/2006 | Saliba et al. |
| 7,095,583 B2 | | 8/2006 | Johnson et al. |
| 7,102,845 B2 | | 9/2006 | Saliba et al. |
| 7,102,847 B2 | | 9/2006 | Bui et al. |
| 7,116,514 B2 | | 10/2006 | Mahnad et al. |
| 7,130,140 B1 | | 10/2006 | Boyer et al. |
| 7,136,255 B2 | | 11/2006 | Mahnad et al. |
| 7,139,151 B2 | * | 11/2006 | Johnson et al. ......... 360/77.12 |
| 7,139,152 B2 | | 11/2006 | Mahnad et al. |
| 7,149,050 B2 | | 12/2006 | Saliba et al. |
| 7,158,338 B2 | | 1/2007 | Koski et al. |
| 7,170,702 B2 | * | 1/2007 | Ohtsu ............... 360/48 |
| 7,245,453 B2 | | 7/2007 | Koski et al. |
| 2002/0060968 A1 | | 5/2002 | Senshu |
| 2002/0176200 A1 | | 11/2002 | Trivedi |
| 2003/0016465 A1 | | 1/2003 | Bul et al. |
| 2003/0043498 A1 | | 3/2003 | Johnson et al. |
| 2003/0058562 A1 | | 3/2003 | Kuki et al. |
| 2003/0123179 A1 | | 7/2003 | Molstad et al. |
| 2003/0165029 A1 | * | 9/2003 | Molstad et al. ......... 360/77.12 |
| 2003/0167438 A1 | | 9/2003 | Aziz |
| 2004/0223248 A1 | * | 11/2004 | Dugas et al. ............... 360/48 |
| 2005/0083600 A1 | | 4/2005 | Mahnad et al. |
| 2005/0083601 A1 | | 4/2005 | Mahnad et al. |
| 2005/0083602 A1 | | 4/2005 | Saliba et al. |
| 2005/0088770 A1 | | 4/2005 | Saliba et al. |
| 2005/0088776 A1 | | 4/2005 | Saliba et al. |
| 2005/0094308 A1 | | 5/2005 | Mahnad et al. |
| 2005/0259349 A1 | | 11/2005 | Koski et al. |
| 2006/0044671 A1 | * | 3/2006 | Weber et al. ............ 360/77.12 |
| 2006/0126207 A1 | * | 6/2006 | Johnson et al. ............... 360/48 |
| 2007/0019316 A1 | | 1/2007 | Norton, Jr. |
| 2007/0064327 A1 | | 3/2007 | Koski et al. |
| 2007/0121240 A1 | | 5/2007 | Duran |

FOREIGN PATENT DOCUMENTS

| | | |
|---|---|---|
| EP | 0 690 442 A3 | 1/1996 |
| EP | 0 690 442 B1 | 1/1996 |
| EP | 1 600 967 A2 | 11/2005 |

OTHER PUBLICATIONS

Aziz, P. M. et al. (Nov. 2004). "Servo Signal Processing," Chapter 30 in *Coding and Signal Processing for Magnetic Recording Systems*, CRC Press Inc: Boca Raton, FL, p. 30-1-30-12.

* cited by examiner

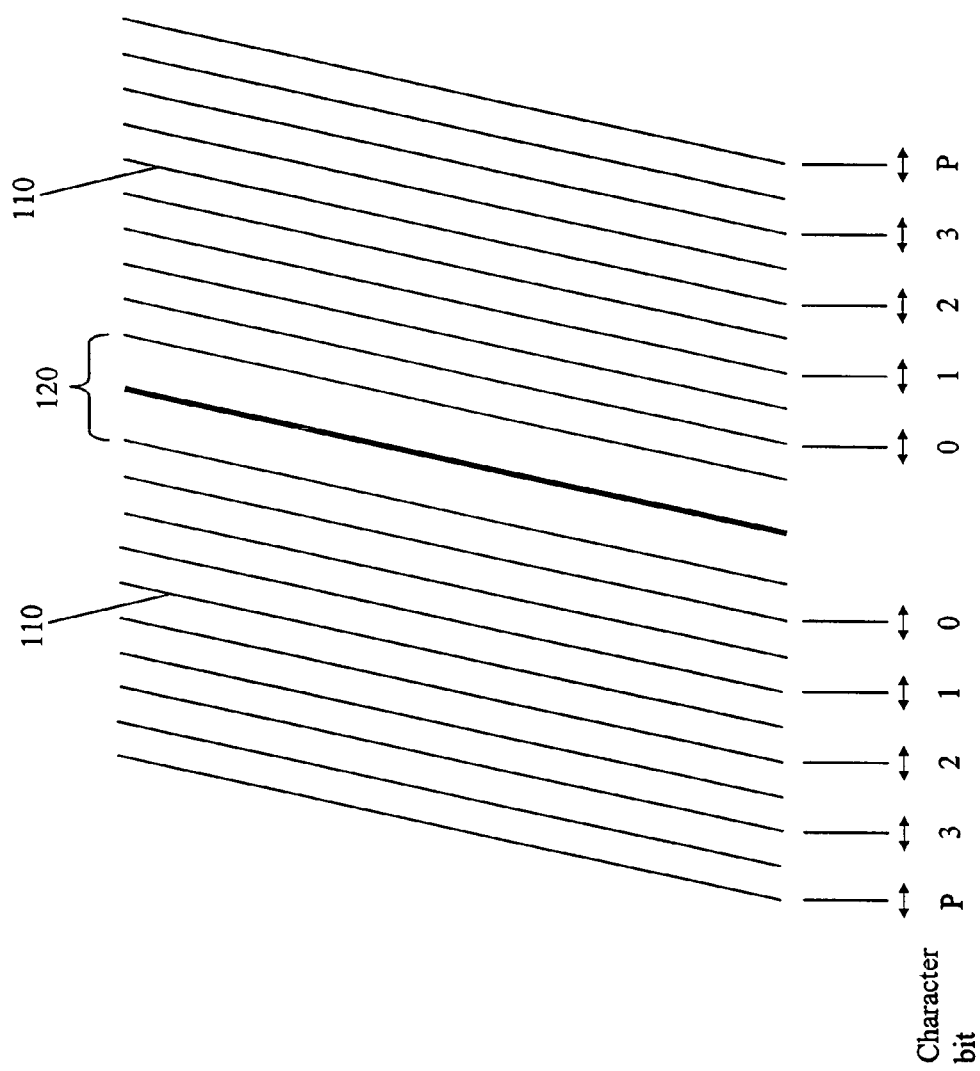

SERVO TRACK HAVING PERIODIC FRAMES OF TONE FIELD AND EMBEDDED SYNCHRONIZATION MARKS

CROSS-REFERENCE TO RELATED APPLICATION

This application is a Divisional of prior application U.S. Ser. No. 10/854,078, filed May 24, 2004 now U.S. Pat. No. 7,158,338, the disclosure of which is herein incorporated by reference in its entirety.

BACKGROUND

1. Field

The invention and its various aspects relate generally to reading and recording data from magnetic storage devices, and more particularly to position detection and servo control methods and systems to assist in maintaining relative position of a magnetic head to magnetic storage media.

2. Description of Related Art

Digital tape-recording remains a viable solution for storage of large amounts of data. Conventionally, at least two approaches are employed for recording digital information onto magnetic recording tape. One approach calls for moving a magnetic tape past a rotating head structure that reads and writes user information from discontinuous transverse tracks. Interactive servo systems are typically employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity, and retrieval performance, is desired of all commercially viable mass storage devices and media. In the case of linear streaming tape recording a popular trend is toward multi-head, multi-channel fixed head structures with narrowed recording gaps and data track widths so that many linear data tracks may be achieved on a tape medium of a predetermined width, such as one-half inch width tape. To increase the storage density for a given cartridge size the bits on the tape may be written to smaller areas and on a plurality of parallel longitudinal tracks. As more data tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head. LTM may be caused by many factors including, tape slitting variations, tension variations, imperfections in the guiding mechanism, vibration or shock to the guiding mechanism, friction variations (mainly at the head), and environmental factors such as heat and humidity. These factors affect LTM in various ways. Some may cause abrupt momentary jumps while others may cause a static shift. Generally, LTM is unpredictable and unrepeatable.

In multi-head, multi-channel magnetic tape storage systems, random lateral tape motion is generally a limiting factor in achieving higher track densities and thus higher user data capacity per tape. In order to maintain proper alignment of the head with the storage tape and data tracks on the tape, the tape is generally mechanically constrained to minimize LTM and data retrieval errors. Miss-registration between the head and the data track can cause data errors during readback and data loss on adjacent tracks during writing.

Various techniques for increasing the track density on magnetic tape employ recording servo information on the tape to provide positioning information to a tape drive system during writing and/or reading processes. Some systems magnetically record a continuous track of servo information which is then read and used as a position reference signal. For example, a variety of techniques have been used including dedicated and embedded magnetic servo tracks, time and amplitude magnetic servo tracks, and the like. Other systems may intersperse or embed servo information with user data. Exemplary tape drive systems and methods are described, for example, in U.S. Pat. Nos. 6,246,535, 6,108,159, 5,371,638, and 5,689,384, all of which are hereby incorporated by reference herein in their entirety.

Other techniques include optical servo systems that follow an optically detectable servo track disposed on the media. Optical servo systems generally require additional optical components such as a light source, optical sensor, and the like, which may reduce actuator response and bandwidth, and increase cost to the servo system.

More robust magnetic servo track methods and systems are desired for detecting the position of a magnetic transducer head relative to a magnetic storage medium, e.g., storage tape, within a media drive system.

BRIEF SUMMARY

In one aspect of the present invention methods and systems are provided for sensing a position of a transducer head with respect to a storage medium. In one example, a method includes generating a read signal from a read element associated with a transducer head, the read signal generated from a servo track stored on a magnetic storage medium. The servo track includes servo frames of magnetic flux transitions forming detectable servo marks, the servo marks forming a tone field of repeating servo marks oriented at a first azimuth angle and a mid-frame synchronization mark incorporated within the tone field, wherein the tone field provides a metric reference for dimensional measurements between features within the servo frame, the mid-frame synchronization mark is distinguishable from the tone field, and the number of servo marks in the tone field of each servo frame along a longitudinal direction of the servo track before the mid-frame synchronization mark and after the mid-frame synchronization mark varies with lateral position. The method may further include determining a number of servo marks in the tone field of a servo frame located before the mid-frame synchronization mark and after the mid-frame synchronization mark from the read signal, and determining a relative position of the read head to the servo track based on the number of servo marks before and after the mid-frame synchronization mark.

Another exemplary method includes generating a read signal from a read element, the read signal generated in response to a servo track stored on a magnetic storage medium. The servo track includes a servo frame of magnetic flux transitions forming detectable servo marks, the servo marks forming a tone field of repeating servo marks oriented at a first azimuth angle and a mid-frame synchronization mark incorporated within the tone field servo marks, wherein the tone field provides a metric reference for dimensional measurement of the mid-frame synchronization mark within the servo frame.

In another aspect, a servo control system for positioning a magnetic head adjacent a surface of a magnetic storage medium for reading a servo pattern recorded on the magnetic storage medium is provided. In one example, a system includes a head assembly having at least one read head for reading a servo track recorded on the storage medium and generating a read signal representative of the servo track, an actuator configured to adjust the relative position of the head assembly to the storage medium, and a servo controller. The servo controller is configured to control the actuator based on the read signal, wherein the servo controller identifies servo frames within the servo track, each servo frame having a tone field of repeating servo marks comprising a metric reference for dimensional measurements and a mid-frame synchronization mark within the tone field of repeating servo marks, wherein the mid-frame synchronization mark is distinguishable from the tone field, and the number of servo marks in the tone field of the servo frame along a longitudinal direction of the servo track before the mid-frame synchronization mark and after the mid-frame synchronization mark varies with lateral position. The servo controller determines a number of servo marks in the tone field of a servo frame located before the mid-frame synchronization mark and after the mid-frame synchronization mark, and determines a relative position of the read head to the servo track based on the number of servo marks before and after the mid-frame synchronization mark.

In another aspect, a method for writing a servo track on a magnetic storage medium is provided. In one example, a method includes moving a magnetic storage medium in a longitudinal direction relative to a first recording element and a second recording element, wherein the first recording element and the second recording element are aligned along the longitudinal direction and are oriented at different azimuth angles. Current pulses are generated in the first recording element and the second recording element to write servo frames forming a servo track, wherein within each servo frame the first recording element writes a tone field of repeating servo marks and the second recording element overwrites a portion of the tone field with a synchronization mark such that the number of servo marks in the tone field of each servo frame along the longitudinal direction of the servo track before the mid-frame synchronization mark and after the mid-frame synchronization mark varies with lateral position.

In another aspect, a magnetic storage medium including a servo track is provided. The servo track comprises servo frames of magnetic flux transitions forming detectable servo marks, the servo marks forming a tone field of repeating servo marks oriented at a first azimuth angle. The tone field of servo marks provides a metric reference for dimensional measurements of features in the servo track. The servo track may further include a mid-frame synchronization mark incorporated within the tone field. The mid-frame synchronization mark is distinguishable from the tone field, and the number of servo marks in the tone field of the servo frame along a longitudinal direction of the servo track before the mid-frame synchronization mark and after the mid-frame synchronization mark varies with lateral position.

Various aspects and examples of the present inventions are better understood upon consideration of the detailed description below in conjunction with the accompanying drawings and claims.

BRIEF DESCRIPTION OF DRAWINGS

FIG. 6 illustrates an exemplary method for encoding longitudinal information into a servo track pattern;

DETAILED DESCRIPTION

Figure 1:
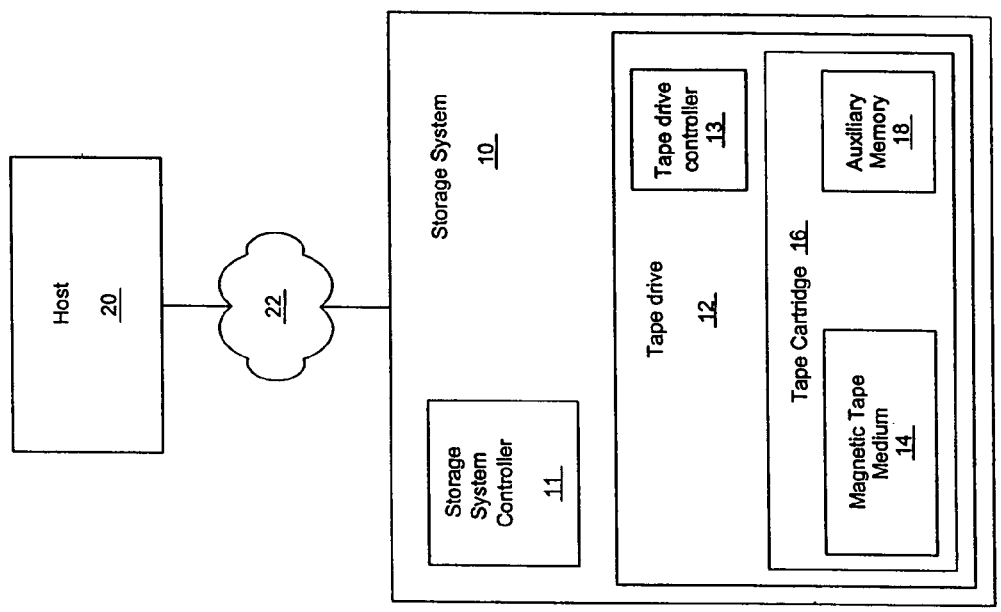
FIG. 1 illustrates an exemplary storage system including a magnetic storage drive and magnetic tape medium.

Various methods and systems for sensing the position of magnetic storage media relative to a transducer head and providing calibration and/or positional information for a servo system, e.g., a primary servo system or subsystem servo, are provided. The following description is presented to enable a person of ordinary skill in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

Accurately positioning a transducer head with respect to a storage tape and data tracks within a tape drive during writing and reading processes is one of the main challenges in the area of magnetic storage tape systems. Generally, a closed loop servo system, deployed by the tape drive electromechanical system, utilizes an estimate of the relative position of the transducer head to the storage tape to align the transducer head to a data track position. Exemplary methods and systems described herein gather positional information for the positioning of a transducer head relative to the storage tape by utilizing a magnetically recorded servo track having a tone field and synchronization marks.

In one example, a servo track formed longitudinally along a magnetic storage medium includes a periodic (e.g., repeating, but not necessarily identical) sequence of magnetic flux transitions forming a pattern of detectable servo marks (each period or repeating sequence of servo marks is referred to herein as a "servo frame"). In one example, each servo frame includes a tone field of repeating servo marks separated by a known distance and oriented at an azimuthal angle. Each servo frame additionally includes at least two uniquely identifiable features, referred to herein as synchronization marks, distinguishable from the tone field. The identifiable synchronization marks may include, for example, a servo mark or marks of varying size and/or azimuthal angle from the tone field. In another example, an identifiable feature may include an erased band of the tone field. At least one of the identifiable features, e.g., a servo mark or erased band, is oriented at an azimuthal angle different than the tone field such that the number of servo marks in the tone field measured along a longitudinal direction of the servo track varies with the lateral position of the servo track from the first synchronization mark to the second synchronization mark, and from the second synchronization mark to a first synchronization mark in the next servo frame of the periodic pattern.

In operation, a read head follows the servo track and detects the tone field and the synchronization marks to determine a relative position of the read head to the servo track. The tone field provides a reference for measuring the distance between the synchronization marks, and the lateral position of the servo read head is derived from the measured distance between successive synchronization marks and the known geometry of the servo track. In one example, a narrow (relative to the servo track) servo read element in a drive head cluster detects flux transitions in the servo track. The signal developed by the servo read element provides a sequence of pulses associated with the tone field and synchronization marks. A controller, e.g., through suitable detection logic, identifies the pulse spacing of the tone field and the unique pulse spacing or other detectable characteristic of the synchronization marks and controls counters that measure the distance between the synchronization marks via the tone field pulses which provide a distance measurement reference. The lateral position of the servo head may then be calculated based on the measured distances.

The exemplary servo tracks provide a suitable pattern to measure position directly by measuring dimensions between synchronization marks within a servo track via a recording head cluster. By monitoring position with magneto-resistive servo read elements within the cluster of data elements, the mechanical tracking error can be reduced to a photolithographic tolerance of head fabrication. This may remove tracking error components that arise from mechanical tolerances caused by remotely detecting position, e.g., in the case of an optical Vocalizer that monitors position of an optical servo track on the back side of a storage tape. The exemplary magnetic detection of track position may also eliminate or reduce the need for calibrating optical position to fine alignment fields (FAFs) recorded on the magnetic surface.

Additionally, in instances where optical servo systems may be removed, the mass of the actuator (for translating the recording head) is reduced, thereby increasing the servo system bandwidth and allowing the system to achieve higher data track densities. Eliminating optical servo systems also reduces the cost and complexity of the drive system.

Initially, with reference to FIG. 1, an exemplary storage system 10 including tape drive 12 and magnetic tape medium 14 is described, which may employ exemplary servo methods and systems described herein. Tape storage system 10 may include a storage system controller 11 for controlling one or more tape drives 12 contained within the storage system 10 and for controlling other components of storage system 10, such as a tape picker (not shown), which is used to select and load tape cartridges 16 into the tape drives 12. The storage system 10 may be coupled to a host system 20 which transmits I/O requests to the storage system 10 via a host/storage connection 22.

The tape drive 12 reads and writes data to the primary storage medium, shown in FIG. 1 as a magnetic tape medium 14 contained within a removable magnetic tape cartridge 16. The magnetic tape medium 14 typically comprises a thin film of magnetic material which stores the data. The tape medium 14 may be moved by the tape drive 12 between a pair of spaced apart reels and past a data transducer to record or read back information. The data transducer head is typically part of a head carriage assembly capable of being translated laterally to a tape path by tape drive controller 13, and being responsive to a positioning system for maintaining the transducer head adjacent the tape path. Tape drive controller 13 may thereby translate the transducer head laterally with respect to the storage medium, e.g., in response to position information from a servo system to compensate for LTM, follow data tacks, and the like. Various actuator devices may be employed to support and translate the data transducer head in response to read/write operations and servo control signals as are generally known in the art.

In one type of tape drive system, one of the reels is part of the tape drive 12 while the other reel is part of the removable tape cartridge 16. For this type of tape drive system, the reel which is a part of the tape drive 12 is commonly referred to as a take-up reel, while the reel which is a part of the tape cartridge 16 is commonly referred to as a cartridge reel. Upon insertion of the tape cartridge 16 into the tape drive 12, the magnetic tape medium 14 on the cartridge reel is coupled to the take-up reel of the tape drive 12. Subsequently, prior to removing the tape cartridge 16 from the tape drive 12, the storage tape 14 is rewound onto the cartridge reel and is then uncoupled from the take-up reel. Tape cartridge 16 may further include auxiliary memory 18 as is generally known in the art.

Various exemplary tape drive systems and methods may be used with the various exemplary position and servo systems and methods described herein and include, for example, those described in U.S. Pat. Nos. 6,246,535, 6,108,159, and 5,371,638, and U.S. patent application Ser. No. 09/865,215, all of which are hereby incorporated by reference as if fully set forth herein. Those of ordinary skill in the art will recognize, however, that various other suitable tape drive systems and servo systems (perhaps with some modification that will be apparent to those of ordinary skill in the art) may be used with one or more of the exemplary systems and methods described.

Figure 2A:
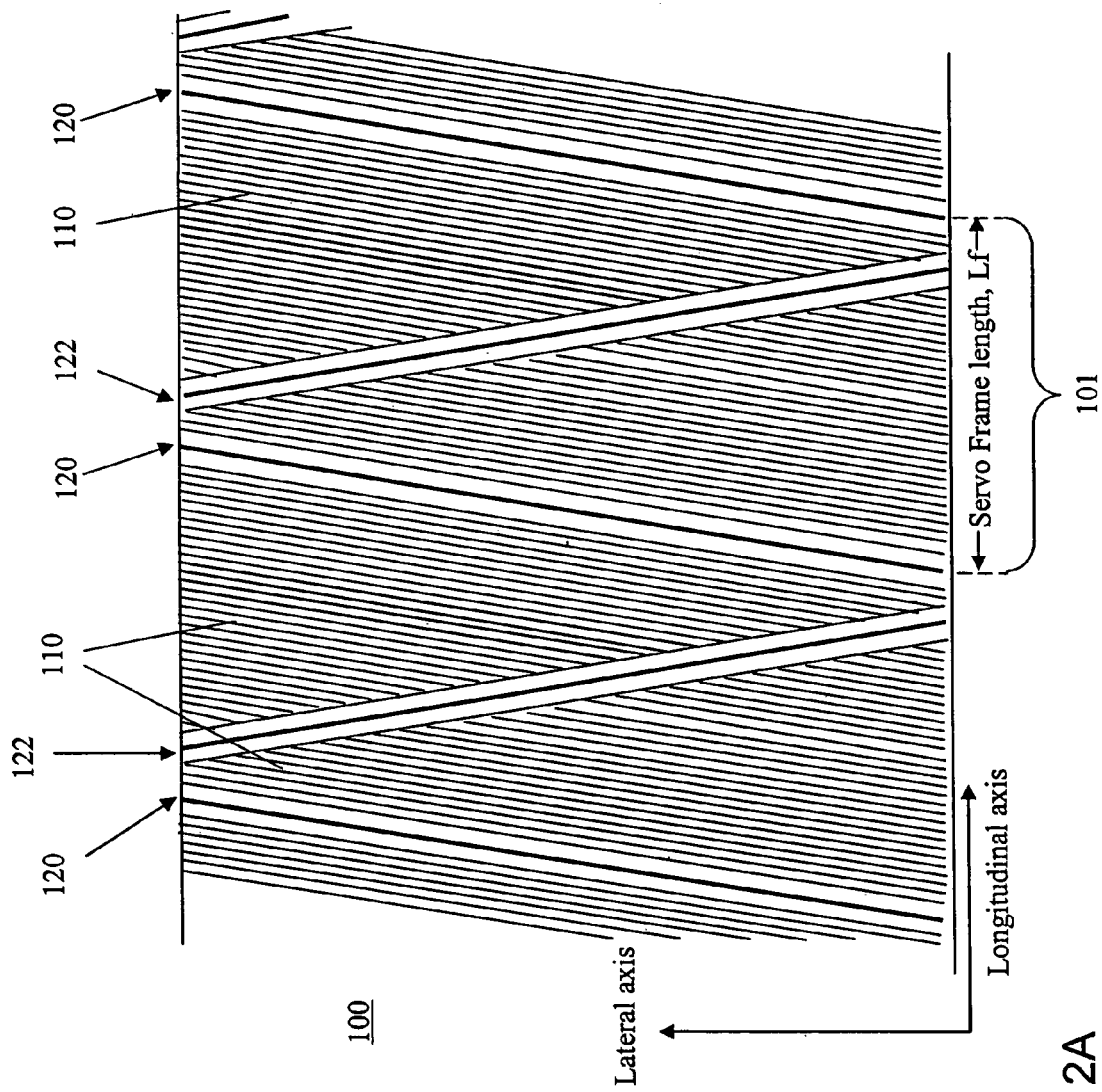
FIG. 2A illustrates an exemplary servo track pattern for providing positional information.

FIG. 2A illustrates an exemplary servo track 100 that may be recorded on magnetic storage media and provide positional information to a media drive system. In particular, servo track 100 may be read by a transducer head of a media drive to provide detection of the lateral position of the transducer head relative to the servo track and magnetic storage tape. The drive servo system may adjust the position of the transducer head to the storage medium based on the position information.

Servo track 100 includes periodic (i.e., repeating) servo frames 101, with a length dimension, Lf, having tone field 110 and at least two dissimilar, yet identifiable synchronization marks 120 and 122. Tone field 110 includes flux transitions with constant spacing called servo marks, referred to as the tone field or metric field, oriented at a first azimuth angle. Additionally, at least one synchronization mark, e.g., synchronization mark 122, is embedded within tone field 110 and at a second azimuth angle such that the number of flux transitions in tone field 110 before and after synchronization mark 122 of each servo frame of length Lf varies with the lateral position within the servo track 100. In one example, the flux transitions of tone field 110 are spaced apart by known distances and thereby provide a direct measurement of distance along the length of the servo track 100, e.g., between successive synchronization marks 120 and 122. In this instance, synchronization mark 120 is oriented at the first azimuth angle, and is associated with the beginning or start of a servo frame 101, and synchronization mark 122 is associated with an intermediate point of the servo frame 101 (but not necessarily located at the physical center of servo frame 101 as discussed below), where a subsequent synchronization mark 120 indicates the end of the current servo frame 101, and the start of a new servo frame 101. In this manner each servo frame 101, is bounded at the start and end by synchronization marks 120, oriented at a first azimuth angle, between which is a tone field of a fixed number of flux transitions with constant spacing oriented at the first azimuth angle, and in which is embedded a different synchronization mark 122, oriented at a second azimuth angle.

A read transducer employed to detect the servo track 100 may have a width that is narrow relative to the servo track width, and such a transducer traces a thin line along the length of, and within the servo track 100 as it detects the flux transitions of the servo track. Along a line parallel to the centerline of servo track 100, and within servo track 100, the number of flux transitions in tone field 110 will vary before and after mid-frame synchronization mark 122 of each servo frame 101. For example, moving from left to right through the lower half of servo track 100, along this line, a greater number of flux transitions in tone field 110 of servo frame 101 occur before synchronization mark 122 than after synchronization mark 122. Conversely, near the upper half of servo track 100, a greater number of flux transitions in tone field 110 occur after synchronization mark 122 than prior to synchronization mark 122. By counting the number of flux transitions in tone field 110 in a servo frame 101 from start-frame synchronization mark 120 to the mid-frame synchronization mark 122, and by counting the number of flux transitions in the tone field 110 in the same servo frame from the mid-frame synchronization mark 122 to the next start frame synchronization mark 120, and by subtracting those counts, a relative lateral position of the read head to servo track 100 may be derived.

In this example, synchronization marks 120 and 122 are illustrated as magnetic flux transitions forming different identifiable marks similar to the servo marks of tone field 110, but varying in size, and synchronization mark 122 varying in azimuth angle. In other examples, one or more of synchronization marks 120 and 122 may include other features identifiable by a read head to demark servo frames and form a mid-frame synchronization mark such that the number of tone field servo marks before and after mid-frame synchronization mark 122 varies with lateral position. Such synchronization marks 120 and 122 may be formatted to enhance the detection of synchronization marks, to improve the resolution of the longitudinal position measurement while minimizing uncertainties arising from noise, signal distortion, and other detection channel characteristics.

Figure 2B:
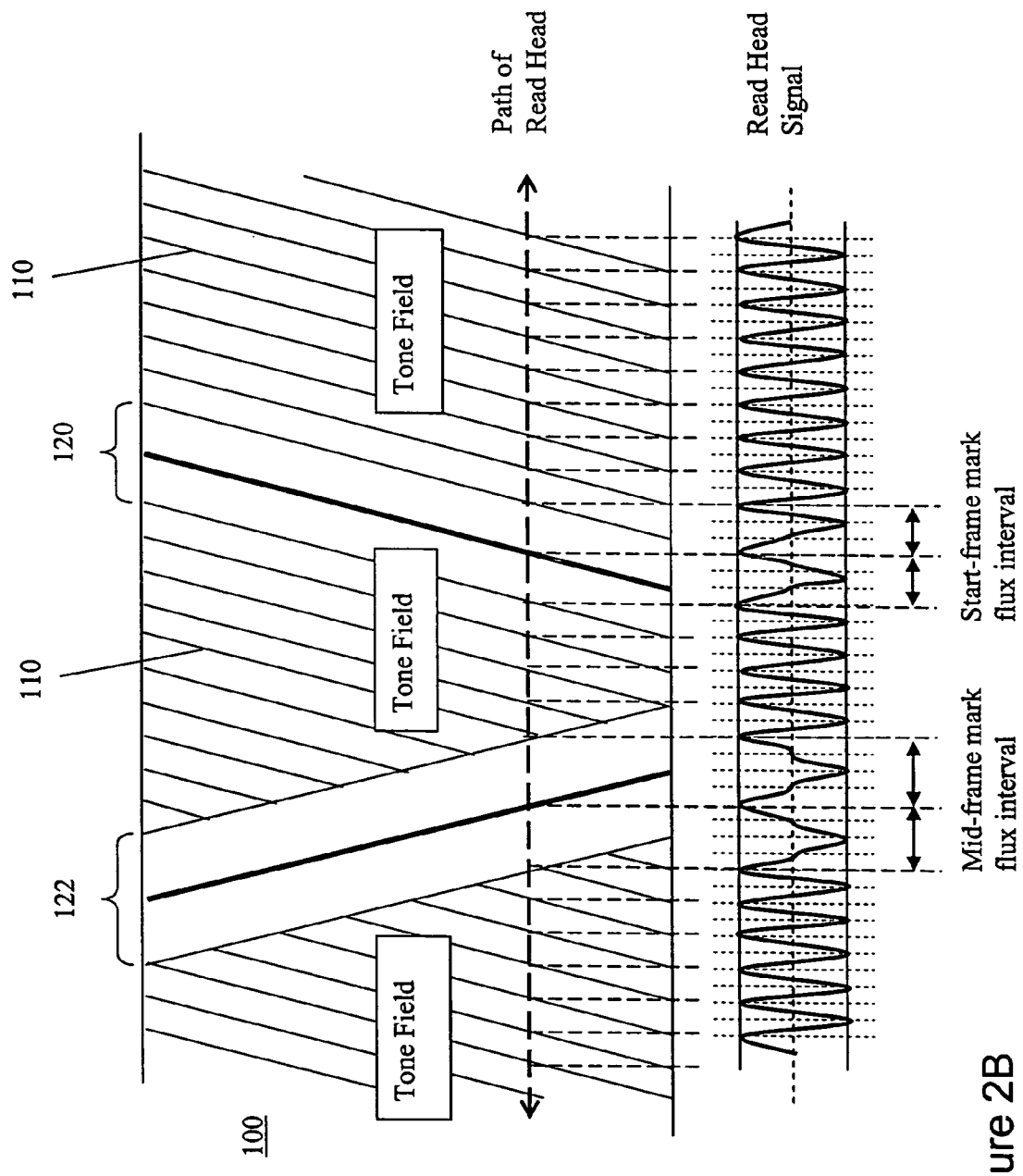
FIG. 2B illustrates an exemplary servo track pattern, read head path, and associated read head signal generated from a portion of the servo track.

In one example, servo track 100 is pre-recorded longitudinally along the length of a magnetic storage tape and is wide relative to a read transducer width and data track width for a particular media drive. Servo track 100 may therefore provide multiple data track index positions across its width to a servo control system. FIG. 2B illustrates an exemplary path of a relatively narrow read transducer of a drive system along servo track 100 and the resultant read signal developed in the read head (shown below servo track 100). Tone field 110 provides a signal with a tone frequency proportional to longitudinal tape speed in the generated read signal and in which are embedded two unique synchronization marks 120 and 122 with distinct frequencies different from each other, and different from the tone signal frequency. As described, servo track 100 is configured such that synchronization marks 120 and 122 occur periodically in distance along the length of servo track 100. The separation between successive start-frame marks 120 defines the length of one servo frame interval Lf and the mid-frame synchronization marks 122 are positioned between start-frame synchronization marks 120 such that the number of tone field 110 flux transitions in the servo frame before and after the mid-frame synchronization mark 122 varies with lateral position. In this example, the first and second synchronization marks 120 and 122 have unique flux spacing, both of which are greater than the flux spacing of the tone field.

A suitable controller, e.g., including a suitable signal decoder and the like, identifies start-frame synchronization mark 120 by its unique flux spacing and the mid-frame synchronization mark by its unique flux spacing 122. The controller further determines the spacing between synchronization marks 120 and 122 by counting the number of flux transitions in tone field 110 there between.

In this example, the servo read head travels along servo track 100 and produces a continuous sequence of pulses as shown. A peak detection channel may process the read signal from the servo head. Additionally, the read head signal may be received by an analog front-end (AFE) chip and converted to numerical data by a suitable analog-to-digital converter and detection channel. The digital pulses or numerical data may then be processed by synchronization mark detection logic configured to detect intervals between pulses and identify those pulses associated with synchronization marks 120 and 122 and tone field 110. Alternatively, the digital pulses or numerical data may be processed by correlation detectors or maximum likelihood detectors to identify synchronization marks 120 and 122 and tone field 110. Various other methods of processing the read signal, e.g., analog or digital, to identify the features of servo track 100 will be apparent to those of ordinary skill in the art.

In one example, a one-micron interval identifies the tone-field pulses, and longer intervals identify the synchronization marks 120 and 122, e.g., a 2.0 micron interval identifies the mid-frame synchronization mark 122 and a 1.5 micron interval identifies the start-frame synchronization mark. Accordingly, the controller identifies synchronization marks 120 and 122 based on the relatively larger intervals of detected peaks in the synchronization mark signal differing from the relatively smaller intervals of detected peaks associated with the tone field 110.

Servo track 100 is read by a narrow servo read element (not shown) having a width of, e.g., 2 microns, along a read head path as shown. The width of the servo track spans several data track widths and may provide multiple index positions for reading and recording data tracks. In one example, the lateral width of servo track 100 is 94 microns and each written data track width is 10 microns such that 8 data track index positions are provided within the width of servo track 100.

Figure 3:
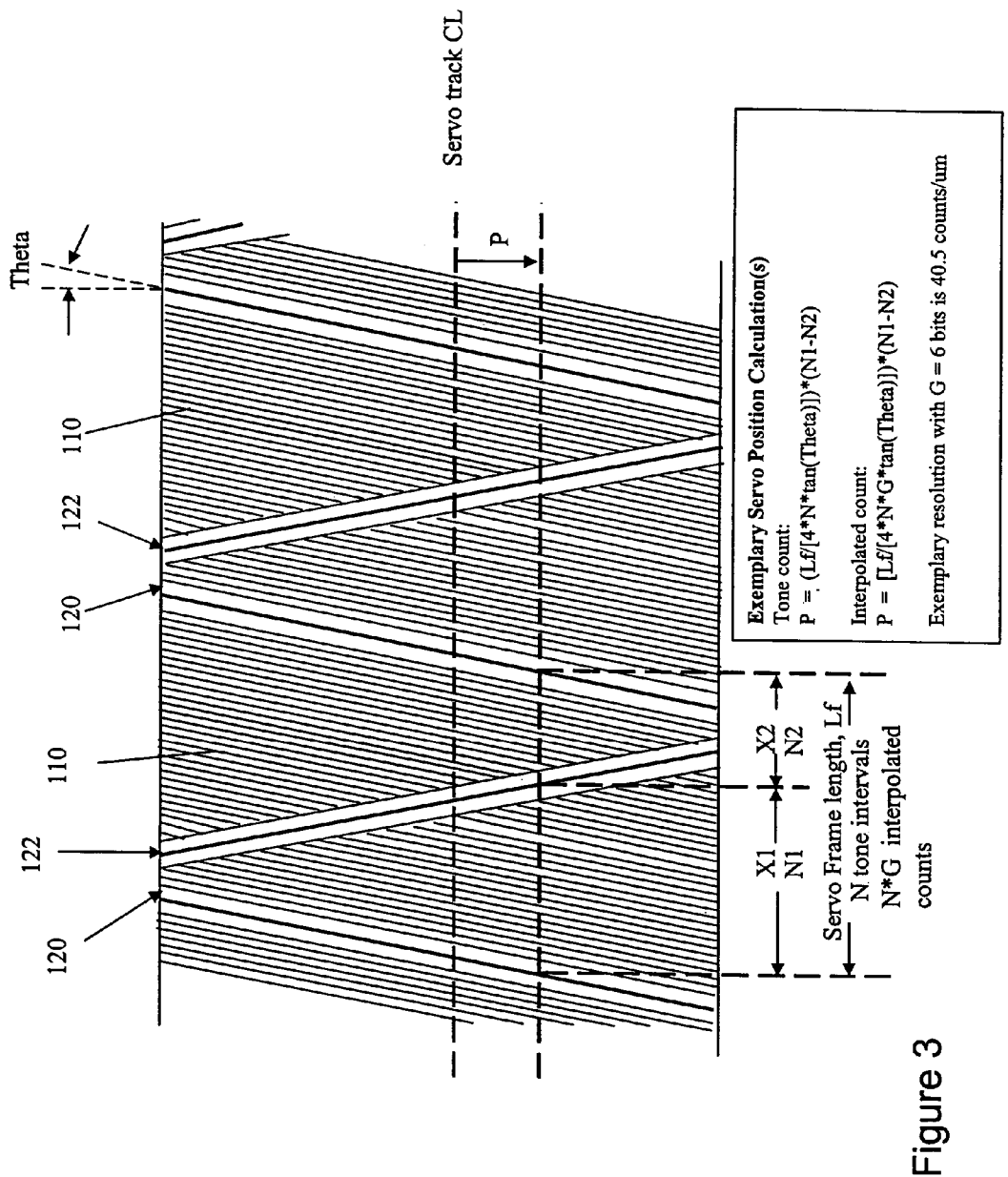
FIG. 3 illustrates an exemplary servo track position calculation from an exemplary servo track pattern.

With reference to FIG. 3, an exemplary servo position calculation is described in detail, which may be carried out, e.g., by any combination of hardware, software, and firmware associated with a drive system. When the signal from tone field 110 and signals associated with synchronization marks 120 and 122 are identified, the position of the servo read head within servo track 100 may be determined. The distance from start-frame synchronization mark 120 to mid-frame synchronization mark 122, and the distance from mid-frame synchronization mark 122 to start-frame synchronization mark 120 of the next servo frame varies with the lateral position of the servo read head within servo track 100. As the servo read head moves downward in the servo track, the distance between start-frame synchronization mark 120 and mid-frame synchronization mark 122 increases, and conversely the distance between the mid-frame synchronization mark 122 and start-frame synchronization mark 120 of the next servo frame decreases. These two distances are measured by using tone field 110 as a metric reference, and the two distances provide information for computing lateral position of the servo read head relative to servo track 100.

In this example, when the servo read head is laterally positioned at the center of servo track 100, "Servo track CL," there is an equal distance and equal number of flux transitions of tone field 110 (or count pulses in the read signal) from the start-frame synchronization mark 120 to the mid-frame synchronization mark 122 as from the mid-frame synchronization mark 122 to the next start-frame synchronization mark 121. In one example, the value of the position signal may be set at zero for the servo track center CL.

For positions of the servo head above the centerline of the servo track, there are fewer count pulses, N1, from the start-frame synchronization mark 120 to the mid-frame synchronization mark 122 than from the mid-frame synchronization mark 122 to the next start-frame synchronization mark 120, N2. For these positions of the servo head, the calculation of head position will have a value that is negative. The computed head position decreases linearly from zero as the head position moves toward the upper edge of servo track 100.

For positions of the servo head below the centerline of the servo track, there are more count pulses, N1, from the start-frame synchronization mark 120 to the mid-frame synchronization mark 122 than from the mid-frame synchronization mark 122 to the next start-frame mark 120, N2. For these positions of the servo head, the calculation of head position will have a value that is positive. The computed head position increases linearly from zero as the head position moves toward the lower edge of servo track 100. In other exemplary computations, a zero reference point may include the top or bottom edge of servo track 100.

The position of the mid-frame synchronization mark 122, as detected by a read head within the servo frame 101, advances toward the beginning of servo frame 101 as the servo head moves upward in the servo track 100, and mid-frame synchronization mark 122 retreats away from the beginning of the servo frame 101 as the servo head moves downward in the servo track 100. It will be recognized by those of ordinary skill in the art that the description depends in part on the frame of reference and relative motion of the read head, servo track, and the like.

The relationship between lateral distance, P, of the head from the centerline of servo track 100 and the distance between start-frame synchronization mark 120 to mid-frame synchronization mark 122, X1, and mid-frame synchronization mark 122 to the next start-frame synchronization mark 120, X2, is given in Equation 1, where the azimuth angle of the two marks to the transverse axis is Theta.

$$P=[1/(4*\tan(Theta))]*(X1-X2) \qquad \text{Equation 1}$$

The dimensions, X1 and X2, are measured by employing the following equations and methods. In one example, the length of the interval between tone field pulses is 1 micron. The number of tone field pulses from the start-frame synchronization mark 120 to the mid-frame synchronization mark 122, N1, is counted, and the number of pulses in the tone field from the mid-frame synchronization mark 122 to the start-frame synchronization mark 120 of the next servo frame 120, N2, is counted. In this example, the distance from the start-frame synchronization mark 120 to the tone field is 1.5 microns, and the distance from the mid-frame synchronization mark 122 to the tone field is 2.0 microns. X1 and X2 are calculated from these parameters, and Equation 1 is solved for P as follows.

$$X1=(N1+2.5) \text{ microns} \qquad \text{Equation 2}$$

$$X2=(N2+2.5) \text{ microns} \qquad \text{Equation 3}$$

$$P=(1/[4*\tan(Theta)])*(N1-N2) \text{ microns} \qquad \text{Equation 4}$$

In one example, the length of the tone interval is not 1 micron, but is such that a fixed number of tone intervals N, equals the length of the servo frame Lf. In this example the distance from the start-frame mark 120, to the tone field is Xsf, and the distance from the mid-frame mark 122, to the tone field is Xmf. The dimensions X1 and X2, in this case are measured by counting the number of tone field pulses N1, from start-frame mark 120, to mid-frame mark 122, and counting the number of tone field pulses N2, from mid-frame mark 122, to the start-frame mark of the next servo frame. X1 and X2 are calculated from these parameters, and Equation 1 is solved for P as follows.

$$X1=Lf/N*(N1-1)+Xsf+Xmf \qquad \text{Equation 5}$$

$$X2=Lf/N*(N2-1)+Xsf+Xmf \qquad \text{Equation 6}$$

$$P=(Lf/[N*4*\tan(Theta)])*(N1-N2) \qquad \text{Equation 7}$$

In one example, X1 and X2 are measured with increased resolution by computing dimension intervals between the tone field and the synchronization marks to values represented by integral plus fractional parts of the tone interval. The fractional part of the tone interval is represented by a number, which may vary between zero and a maximum value, G. The length of the tone interval is such that a fixed number of tone intervals, N, equals the length of the servo frame, Lf. Represented in dimensional units of 1/G times the tone flux interval, the length of a full tone interval is equal to G and the length of the servo frame is N*G. To compute the values of X1 and X2 in Equation 1, accumulators are employed to add dimension intervals beginning at the start-frame mark 120 and ending at the mid-frame mark 122, and likewise beginning at the mid-frame mark 122 and ending at the start-frame mark 120 of the next servo frame. The value of G is added to an accumulator when a tone pulse is detected. When a synchronization mark is detected, the interval between the tone field and the synchronization mark, which is a number greater than G, is added to the accumulator. If the flux transition spacing of the start-frame mark is 1.5 times the flux transition spacing of the tone field, then the value added to the accumulator for the start-frame mark is 1.5*G. The interval between the tone field and the mid-frame mark varies with lateral position of the servo read head, and is bounded by the flux interval of the mid-frame mark 122 and the sum of the flux intervals of the tone field 110 and mid-frame mark 122. When the mid-frame mark 122 is detected, the distance between the tone field and the mid-frame 122 mark is computed and is a number greater than G, representing the distance in integral plus fractional parts of the tone field interval. If the mid-frame mark flux interval is 2 times the tone flux interval, then the value of the interval between tone field 110 and mid-frame mark 122 is bounded between 2*G and 3*G, and this value is added to the accumulator. The resolution of the linear dimensions computed by the accumulators is Lf/N*G, the value of the accumulator which sums the dimensions from the start-frame mark 120 to the mid-frame mark 122 is N1 and the value of the accumulator which sums the dimensions from the mid-frame mark to the start frame mark of the next servo frame is N2. X1 and X2 are measured in this manner, and Equation 1 is solved for P as follows.

$$X1=(Lf/N*G)*N1 \qquad \text{Equation 8}$$

$$X2=(Lf/N*G)*N2 \qquad \text{Equation 9}$$

$$P=(Lf/[N*G*4*\tan(Theta)])*(N1-N2) \qquad \text{Equation 10}$$

In one example, X1 and X2 are measured with increased resolution by employing a high frequency pulse generator that is phase locked to the tone field pulses. The pulse generator multiplies the number of pulses generated by the tone field, and is commonly referred to as a phase-locked oscillator, or PLO. The PLO produces a fixed number of pulses, G, for each pulse of the tone field, and generally provides these pulses to a counter with finer position resolution than the tone field. The PLO also provides pulses for counting continuously through the synchronization mark regions. The distance between the servo frame synchronization marks may be measured more accurately and with finer resolution by counting PLO pulses between synchronization marks, and without adding the distance from the start-frame synchronization mark 120 to the tone field (in this example, 1.5 microns) and from the mid-frame synchronization mark 122 to the tone field (in this example, 2.0 microns).

In one example, the dimensions, X1 and X2, are measured with a PLO by employing the following equations and methods. The length of the servo frame Lf, is known, and the length of the interval between tone field pulses, Xtone, is also known, e.g., 1 micron. The total number of tone pulse intervals between successive start-frame synchronization marks 120, N, is constant and equal to Lf/Xtone. The total number of PLO pulses in a servo frame is a constant, N*G, and the length interval represented by each PLO pulse is Lf/(N*G). The number of PLO pulses from the start-frame synchronization mark 120 to the mid-frame synchronization mark 122, N1, is counted, and the number of PLO pulses from the mid-frame synchronization mark 122 to the start-frame synchronization mark 120 of the next servo frame, N2, is counted.

The value, N1, represents the distance in PLO pulse intervals between the start-frame synchronization mark 120 and the mid-frame synchronization mark 122. The value, N2, represents the distance in PLO pulse intervals between the mid-frame synchronization mark 122 and the start-frame synchronization mark 120 of the next servo frame 120. X1 and X2 are calculated from these parameters, and Equation 1 is solved for P as follows.

$$X1=(Lf/[N*G])*N1 \qquad \text{Equation 11}$$

$$X2=(Lf/[N*G])*N2 \qquad \text{Equation 12}$$

Substituting the values from Equations 11 and 12 into Equation 1 yields $$P=(Lf/[4*N*G*\tan(\text{Theta})])*(N1-N2) \qquad \text{Equation 13}$$

The above solution for the lateral position of the servo head in the servo track arises from distance measurements and general principles of geometry. The variables are measured distances represented by the values N1 and N2. The position of the servo head is solved by subtracting N2 from N1 and multiplying by a constant. The parameters, Lf, N, Theta, and G are constants determined by the geometry of the servo track and the multiplication factor of the PLO. Accordingly, the solution for lateral servo head position is independent of variables such as tape speed and other time dependent parameters. The resolution to which lateral position is computed is determined by selecting values for Lf, N, G, Theta, and the length of the tone flux change interval along the longitudinal axis of tape. The resolution may be further improved by accumulating the measurements of N1 and N2 over multiple servo frames.

In one example, the PLO maintains phase-lock to the average phase of the tone field 110 throughout the complete servo frame Lf. The dynamic response of the PLO is constrained to allow high frequency variations in the phase error signal without losing phase lock and while tracking normal motion-induced phase variations. The flux transition spacing intervals of the start-frame synchronization mark 120 and mid-frame synchronization mark 122 are selected to provide an integral number of tone-field intervals across these marks thereby allowing the PLO to transition the marks without disturbance. Alternatively, the phase error of the PLO can be sampled during intervals when the tone field is being detected, and held constant during synchronization mark detection.

Additionally, one exemplary method reduces or removes amplitude sensitivity in deriving the track following position signal by providing a continuous read signal, without gaps or intervals when no read signal is present in the detection channel. Since the servo track continuously provides flux transitions that are detected by the servo read head, a continuous read signal is available for detection to produce a continuous pulse sequence. The continuous read signal enhances signal processing, providing highly reliable signal amplitude regulation. There are no gaps in the pulse data stream that must be detected and handled by the system, and which make the detection channel susceptible to noise sources during the time intervals when gaps in the data stream are present. For example, a suitable tone field provides a method for maintaining a detection channel with a minimum or reduced bandwidth. The tone field thus reduces noise by minimizing the channel bandwidth, and maximizing the out-of-band noise rejection. Additionally, the tone field may provide a detection channel signal rich in amplitude peaks for controlling an automatic gain control system. Furthermore, position resolution may be enhanced by a pulse multiplication ratio of an oscillator phase locked to the tone field pulses in the servo track, or by other length interpolation methods.

Implementation of various aspects of the exemplary methods and systems may utilize simple pulse detection and logic circuits as will be recognized by those of ordinary skill in the art, and may be embodied in one or more of software, firmware, and hardware associated with a storage system or media drive system.

In another aspect, exemplary methods and systems for writing servo tracks are provided. In one example, the servo track is written by a pair of format recording heads that simultaneously record the servo track. The two heads are positioned longitudinally, one in front of the other, along the longitudinal length of the tape. A first write head records a continuous servo track tone field (see, e.g., tone field 110 of FIG. 2B) having synchronization marks embedded therein (for example, start-frame synchronization marks 120), and a second head trailing the first head periodically over-writes, and therefore replaces, portions of the continuous servo track of the first head to create a second synchronization mark (for example, mid-frame synchronization marks 122) at a different azimuth angle to the tone field and/or first synchronization mark. For example, the second format head writes unique second synchronization marks into the servo track between the first synchronization marks written by the first head. The synchronization marks written by the second head have a flux spacing and/or azimuth angle that is different from the flux spacing and/or azimuth angle of servo marks in the tone field, and is also different from the flux spacing and/or azimuth angle of the synchronization marks written by the first head. The two recording heads may create a continuous composite servo track with regions written by the first head and other regions written by the second head. In this manner, the servo track is comprised of regions which have flux transitions oriented at more than one azimuth angle, and which transitions at multiple azimuth angles occupy the same longitudinal and lateral dimension of the servo track. The flux transitions recorded at more than one azimuth angle do not occur sequentially along the longitudinal and lateral axes of tape, but occur simultaneously in single regions or areas defined by these axes. In other examples, as described below, one (or both) of the synchronization marks may include an erased region or band of the servo track.

In one example, the first head has a magnetic gap that is oriented at an azimuth angle of, e.g., 9 degrees from perpendicular to the longitudinal axis of the tape. The azimuth angle may range, e.g., between 0 and 20 degrees. The second head has a magnetic gap that is oriented at an azimuth angle different than the first, e.g., equal but opposite to the angle of the first head. The two heads therefore write flux transitions oriented at azimuth angles of equal magnitude but opposite sign or orientation from the transverse axis of the tape. In other examples, varying azimuthal angles (including zero) may be used for first and second write heads to record the tone field, start-frame synchronization marks, and/or mid-frame synchronization marks.

In one example, the position signal derived from the exemplary servo track and position detection method described is applied in a track following system for writing and reading multiple data tracks recorded longitudinally in data bands along side a servo track, between adjacent pairs of servo tracks, or distributed in regions separated by multiple servo tracks. To derive a position error signal useful for data track following, the digital position signal derived from the position computation as described, is subtracted from a reference position for the desired data track position. Accordingly, the width of each servo track spans multiple data track widths and includes multiple index and reference positions associated with data tracks of the databand.

Figure 4:
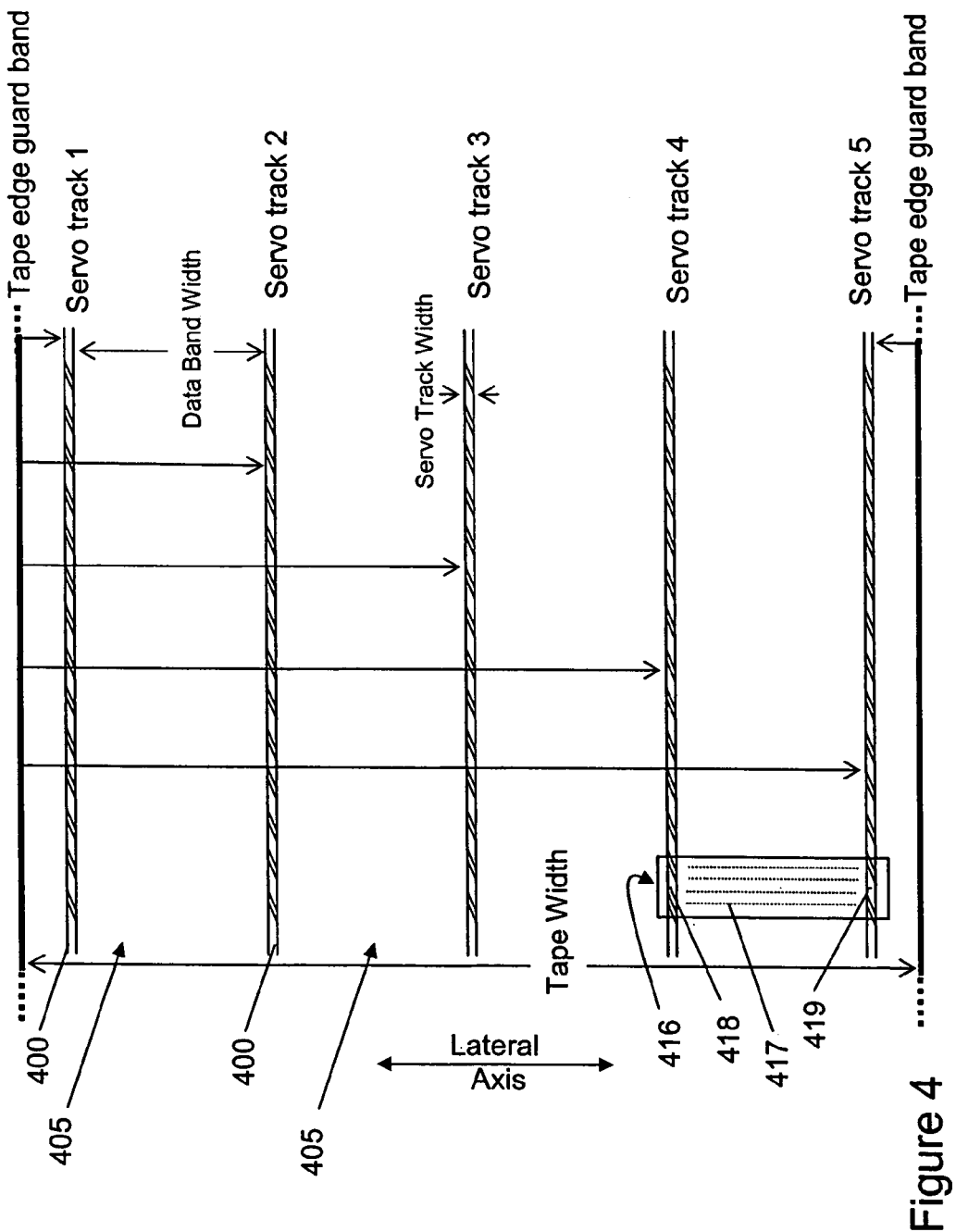
FIG. 4 illustrates an exemplary pattern of servo tracks on a magnetic storage tape.

FIG. 4 illustrates multiple servo tracks recorded longitudinally on a storage tape according to one example. Servo tracks 400 are spaced apart laterally to form multiple regions for data bands 405 separated by servo tracks 400. Also illustrated is an exemplary data recording head 416 including a set of data write and read elements in a data head cluster 417 configured to record and read data tracks between adjacent sets of servo tracks 400. Data head cluster 417 may include dedicated servo read elements 418 and 419 disposed laterally, at the outermost positions of the cluster, configured over servo tracks 400. Servo read elements 418 and 419 may simultaneously read and provide position information from two adjacent servo tracks 400 while data is transferred to and from data band 405. In other examples, a data head 416 may include a single dedicated servo read element 418 displaced laterally, or intermittently translate to read an adjacent servo track 400 with a read element in data head cluster 417 and return to data tracks within data band 405 to continue reading or writing.

Signals from head 416 corresponding to servo elements 417 and 418 may be received by a signal decoder and detector logic as described previously to determine positional information. Head 416 may further be coupled to a head assembly and actuator, which in response to the positional information, translates head 416 to a desired lateral position with respect to servo track 400 and the magnetic storage medium.

In this example, track following misregistration (TMR) error may be relatively small compared to conventional methods because servo position heads may be included within the data head element cluster. Thus, TMR errors may be reduced to photolithographic tolerances and thermal expansion properties of the head and storage tape.

The exemplary servo track format of FIG. 4 includes five servo tracks 400 bounding four data bands 405 across the lateral dimension of tape. In this example, servo track 405 has a width of 94 μm and data band 405 has a width of 2700 μm. The servo track format, positions, and dimensions are illustrative only; any size, number, and configuration of servo tracks 400 and data bands 405 are contemplated to accommodate various storage systems and desired cartridge data capacity.

Figure 5:
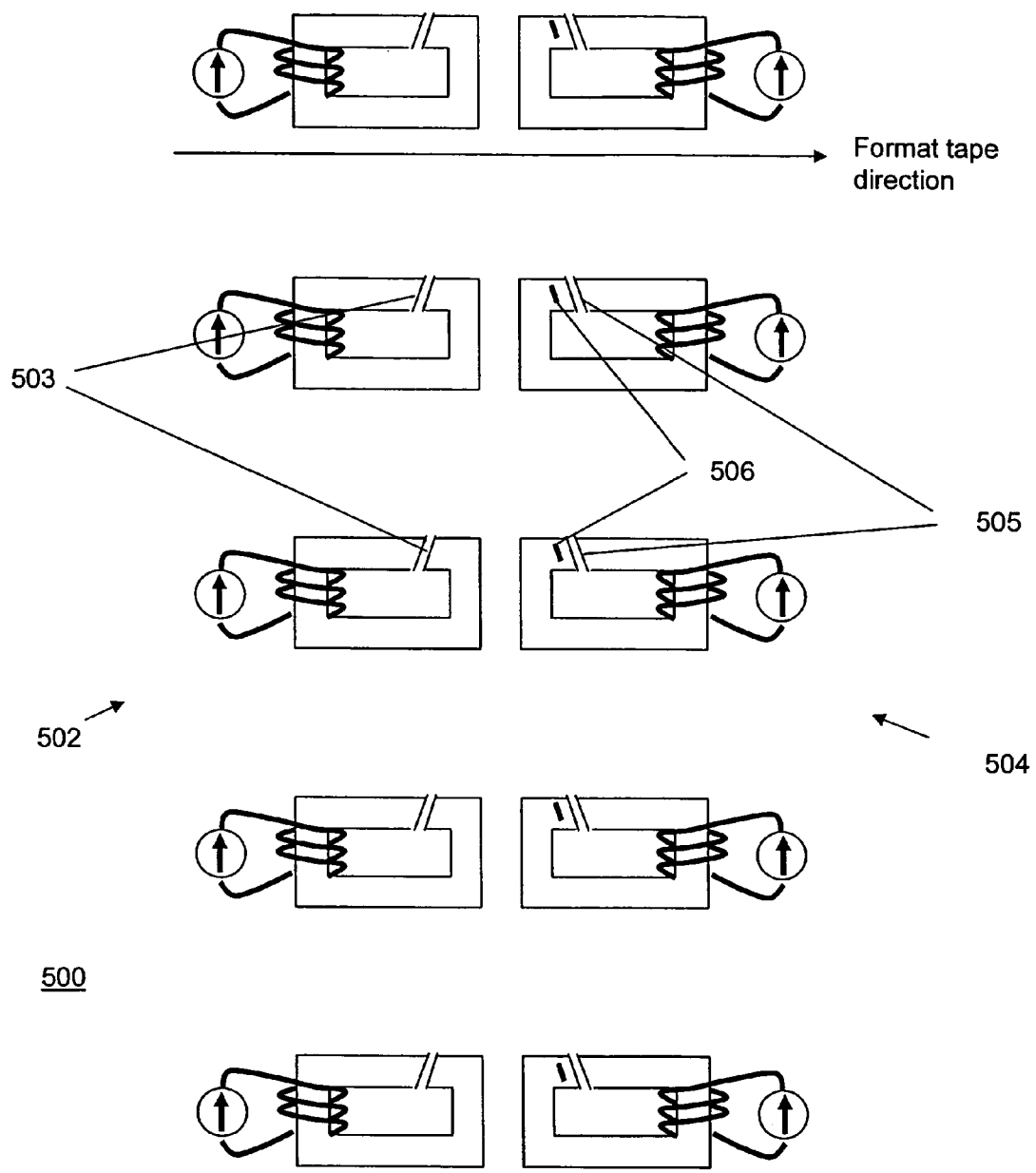
FIG. 5 illustrates an exemplary write head for recording servo track patterns.

In one example, servo tracks 400 are written individually with a write current driver dedicated to each servo track, which allows information unique for each servo track to be encoded into the longitudinal data field for that track. Examples of such unique information include the servo track identification number, servo track calibration information, and the like. FIG. 5 illustrates a conceptual drawing for the configuration of a format head 500 that may write multiple servo tracks 400 as illustrated in FIG. 4. In one example, the first write head cluster 502, having multiple write elements 503, writes multiple servo tracks (e.g., 5 servo tracks) simultaneously, with constant frequency tone and with embedded start-frame synchronization marks spaced at the servo frame interval Lf. The flux transitions are recorded at a first azimuth angle to the transverse axis of the tape. The second write head cluster 504, having multiple write elements 505, periodically overwrites the tracks written by the first head cluster 502 and creates the mid-frame synchronization marks. Write elements 505 have geometry to create flux transitions at a second azimuth angle, different than the first write head elements 503. Write elements 505 may include read transducers 506 to detect the flux transitions written by the write elements 503 for the purpose of accurately placing the mid-frame synchronization marks relative to tone and start-frame synchronization marks written by write elements 503. It should be noted that any number of first write head elements 503 and second write head elements 505, including one of each, are contemplated for formatting a tape with servo tracks.

The position in the servo frame where the mid-frame synchronization marks are written by the second write heads of cluster 504 are controlled to accurately place the mid-frame synchronization marks relative to the tone and start-frame synchronization marks written by the first write head cluster 502. One exemplary method to accurately place the mid-frame synchronization marks in the servo frames of each servo track employs read transducers 506 immediately adjacent to each of the write elements 505. Write head cluster 504 may be bonded to a read head cluster including read transducers 506, or alternatively, write elements 505 may include read transducers 506 fabricated at the same time, and on a shared magnetic flux shield with the write elements 505. In one example, the location for read transducers 506 is in close proximity to write elements 505, and positioned between write elements 503 and 505.

The configuration of write and read transducers produced at the same time, and on a shared shield is common in recording head fabrication methods. With this configuration, transducers 506 read the tone field and start-frame synchronization marks written by the first write elements 503 as they arrive at the write elements 505. The read signals for each servo track are detected by suitable detection channels, and provide separate control signals to each of the write elements 505 to accurately place the mid-frame synchronization marks in the servo frames, relative to the tone and start-frame synchronization marks of those servo frames. In this manner each servo track with a pattern of tone and start-frame synchronization marks written by write elements 503 is separately read at each of the write elements 505 to accurately and independently place the mid-frame synchronization marks in the servo frames of the separate servo tracks.

The signals from read transducers 506 may be detected in suitable detection channels to detect the start-frame marks and tone pulses. When a start-frame mark is detected, a number of tone pulses may be counted to the position in the servo frame where the mid-frame mark is written. When the specific number of tone pulses is counted, write elements 505 may be energized to write the mid-frame mark at that position. Alternatively, the pulses of a phase locked oscillator, PLO, that is locked to the tone field may be counted after the start-frame mark is detected to control the position for writing the mid-frame mark. The PLO may provide greater accuracy for positioning the mid-frame mark in the servo frame, by providing a multiple of PLO pulses for each tone pulse, and by providing a position count signal that is responsive to the average of the detection of many tone pulses.

The cluster of write elements 503 and 505 may be fabricated on a single wafer with conventional head fabrication techniques. Single wafer fabrication techniques may increase the precision and alignment by which multiple servo tracks are written to the storage tape. The write elements 503 and 505 are thereby aligned both longitudinally and laterally through fabrication.

A programmable pattern generator and pulse generator may be used to create intermittent energizing of selective write elements 503 and 505 to record one or more desired servo tracks. Exemplary patterns may be recorded in suitable programmable memory and used to generate desired pulses. Additionally, patterns may be generated by a collection of suitable counters and associated logic as is well known in the art.

The servo tracks thus written may be read at a verification station to assure proper format of the servo tracks. A multiple channel read head positioned after the two clusters of write elements 503 and 505 reads the servo tracks written. The read signals are detected in suitable detection channels for servo track verification. For each servo track, a read transducer and detection channel is provided. In this manner, proper format for the servo tracks is assured.

According to another aspect, the velocity of the storage tape relative to the recording head may be determined from the exemplary servo tracks. Velocity may be derived from measurements of the tone field, which include known separation distances between tone flux transitions. A tape velocity signal may be generated from the servo track and used as a feedback sense signal to the tape transport control system. The tape transport control system may use the velocity information to accurately control tape velocity, adjust tensions, and the like. In one example, the signal includes the frequency of the phase-locked oscillator, the PLO, as previously described. This frequency may be related to tape velocity in any number of methods known in the art as a feedback signal to the drive system, e.g., the controller, which drives the reel motors of the tape drive and the like.

In another aspect, the PLO signal is available as a clock for data channels. In particular, the signal may be used to clock the write data at a constant flux density to tape for variable velocity, and as a clock to assist the read detection of data. The PLO signal therefore may be used to implement a data channel architecture with variable data rate and tape velocity, but with constant data density recorded onto the tape.

In another aspect, information associated with the longitudinal position of the tape may be encoded within the servo track. In one example, longitudinal information is formatted into the servo track by recording a character of data within each servo frame of the servo track. FIG. 6 illustrates an exemplary servo frame encoded with longitudinal positional information. Note that only a portion of tone field 110 and synchronization mark 120 are shown for clarity and the exemplary longitudinal information may be encoded in various servo patterns. A character of multiple bits associated with longitudinal information of the storage tape is recorded twice in each servo frame by phase encoding the tone field flux transitions (servo marks 110) before and after the start-frame synchronization mark 120. The exemplary phase encoding method employed advances the flux transition by a small amount relative to the tone field spacing, e.g., 0.1 microns, to record a "1" bit, and it retards the flux transition by a similar small amount, e.g., 0.1 microns, to record a "0" bit. The character is recorded into the flux transitions symmetrically about the synchronization mark to facilitate reading it immediately following the mark for both forward and backward tape motion.

In this example, the first tone field flux transition on either side of the start-frame synchronization mark 120 is unmodulated and the next adjacent flux transition on either side is encoded with bit 0 of the longitudinal character. Moving out from synchronization mark 120, pairs of flux transitions on either side are alternately unmodulated and phase modulated until bit 3 of the longitudinal character has been encoded. An additional parity or error correction bit, P, for error detection and correction is included to enhance reliability, and is encoded into a final pair of tone field flux transitions assigned to the longitudinal character. For example, the first, third, fifth, seventh, and ninth servo marks of tone field 110 on either side of the start-frame synchronization mark 120 are not phase modulated, and the second, fourth, sixth, eighth, and tenth servo marks are phase modulated. In this manner, each servo frame encodes a 4-bit character of longitudinal position information, including error correction. Multiple encoded characters, which make up a complete longitudinal data field, are recorded over multiple servo frames. The exemplary phase encoding method does not alter the average spacing of the flux transitions in the tone field 110. Additionally, encoding methods other than phase encoding may be used to encode the longitudinal character into the tone field of the servo frame.

The longitudinal information recorded in the servo frame, and specifically, in tone field 110, is thereafter available for detection at all track following index positions and for both tape directions. The longitudinal character can be recovered either before or after the start-frame synchronization mark 120 by storing the tone flux-interval timings before and after the synchronization mark 120 while reading the servo track, and processing these timings with an appropriate detection algorithm. In other examples, the longitudinal character may be stored and retrieved before or after the start-frame synchronization frame or at other locations within the tone field.

In one example, a unique character set is reserved for identifying the beginning of the longitudinal information field to facilitate recovery and assembly of the information. Included in the longitudinal information is a nonrepeating number, which increases along the length of tape, and increments by a value for each successive longitudinal information field. The servo band or track number may also be included to identify the data band at which the recording head is positioned. Additionally, one or more characters may be reserved for use by the media manufacturer, for servo calibration purposes, for future definition, and the like.

Longitudinal and lateral information from an exemplary servo track prevents data tracks from being inadvertently overwritten, e.g., by following in the wrong index position or the wrong data band. For example, each servo frame may be encoded with a complete character of longitudinal information. Further, information unique to each servo track such as track ID, and calibration and control information may be written for the different servo tracks. Each data band stored on a storage tape may also be uniquely identified. Synchronization of data to tape position by detecting the servo track index and longitudinal information encoded in the servo track may advantageously provide for relatively faster access to precise data positions. Additionally, indicators and sensors for detecting the beginning and end of a storage tape may be eliminated because the beginning and end of tape are defined by the longitudinal information.

According to another aspect, the exemplary servo formats described may provide a validity check on the detected position signal. Counting the total number of pulses detected in the servo frame may be used to validate the position measurement recovered from the servo frame. A dropout in the read signal that removes pulses, or noise induced surplus pulses, may be detected by the system. The system may respond with a validity flag set to discard the erroneous sample. Additionally, the sequence of detected patterns within the servo frame may be monitored. A valid servo frame may be identified as one that begins with a start-frame mark, which is followed by tone, which is followed by a mid-frame mark, which is followed by tone, which is followed by anther start-frame mark, and all intervals of which include the proper or expected number of flux transitions. If this sequence is not detected, the system may respond with a validity flag set to discard the erroneous sample. Finally, a combination of detected pulse counts, and proper detection sequence may be used to identify valid servo frames, with validity flags to enhance position signal reliability.

Figure 7A:
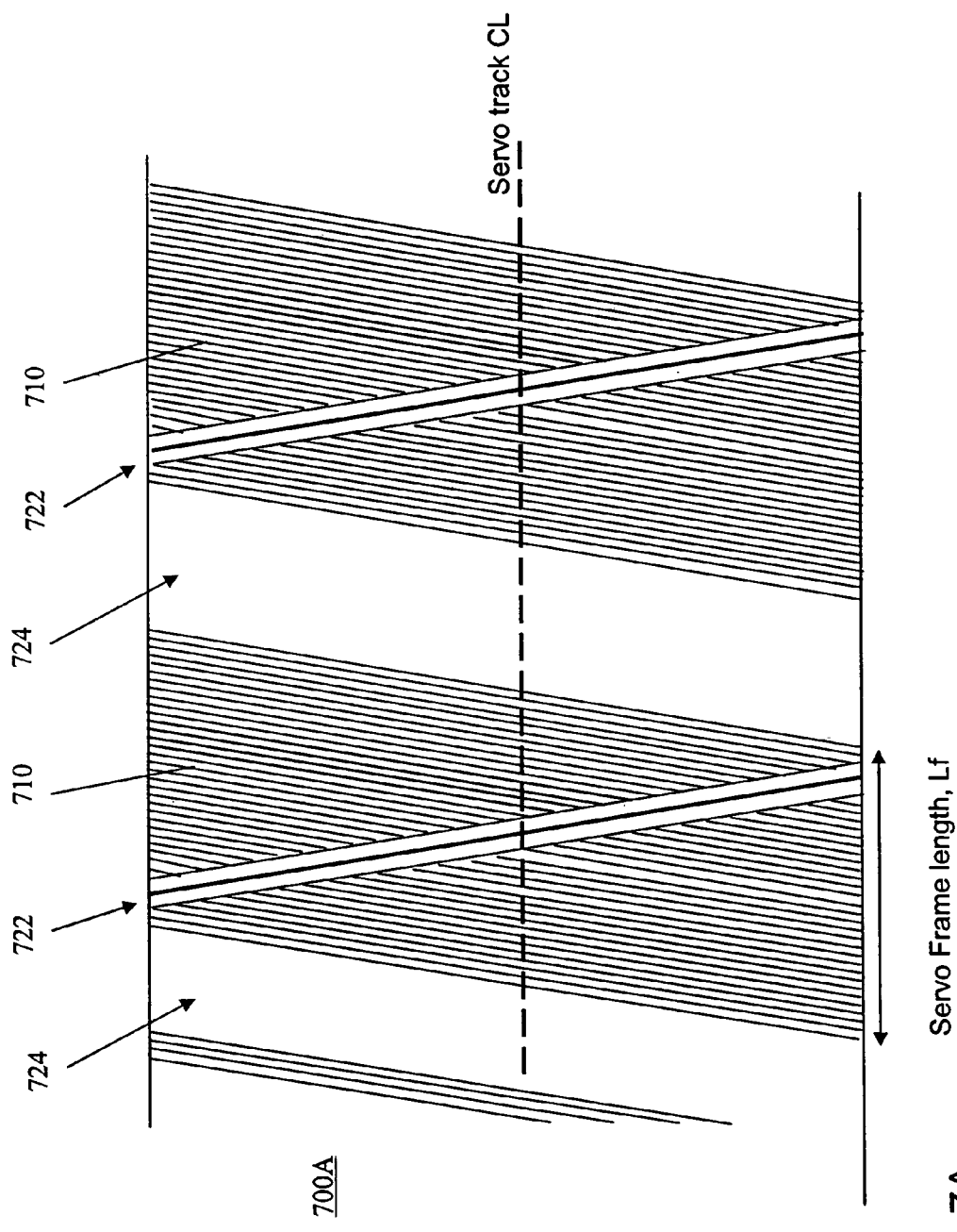
FIGS. 7A and 7B illustrate exemplary servo track patterns including erased bands for providing positional information.
Figure 7B:
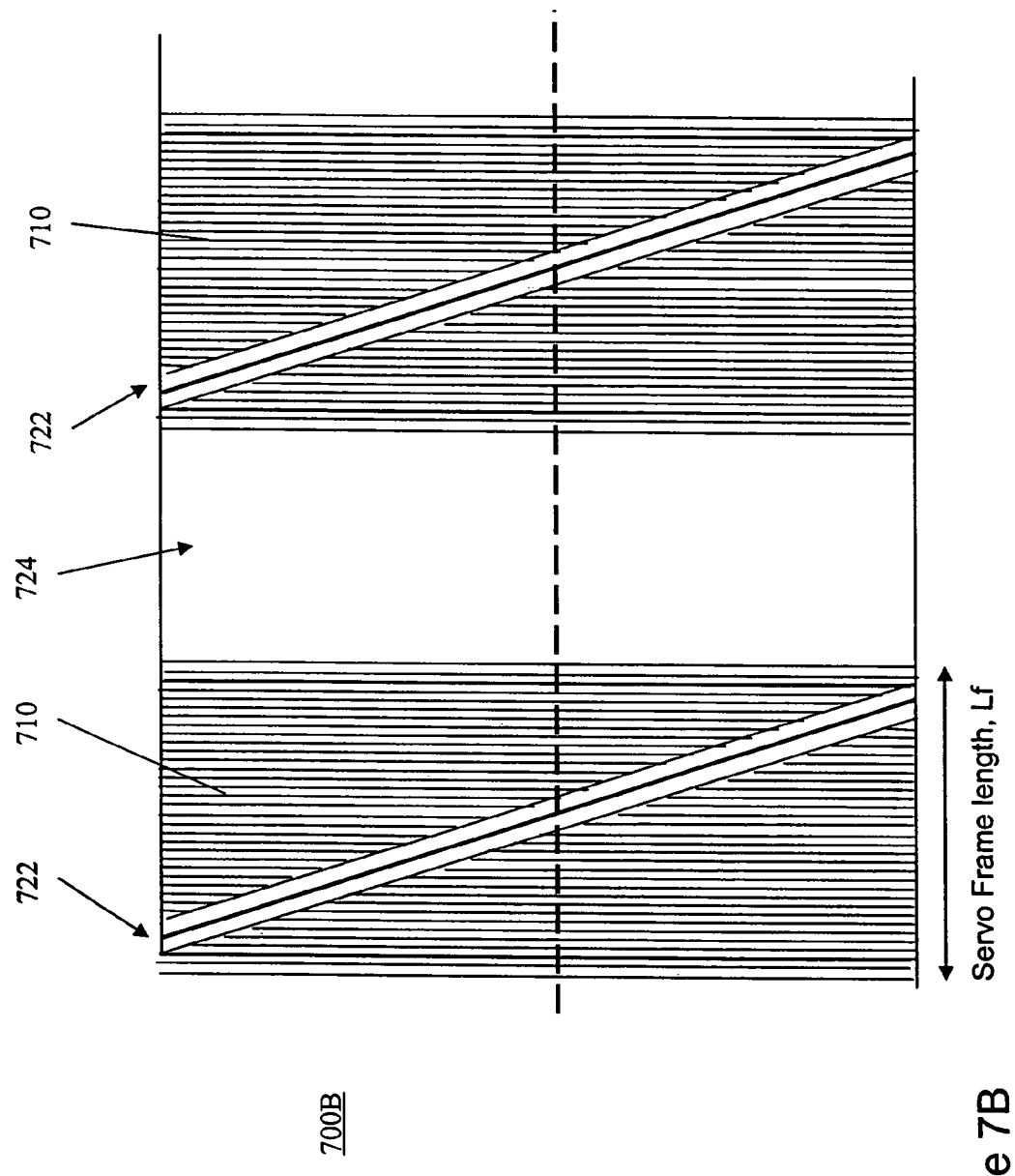

According to another example, a servo track pattern having periodic servo frames separated by short erased regions is provided. In this example, the servo frame includes a tone field of repeating servo marks separated by a known distance and a synchronization mark (e.g., amid-frame mark). In this example, a synchronization mark includes a mid-frame mark of different size and azimuthal orientation relative to the tone field. The mid-frame mark is written on top of the tone field of the servo frame, and occupies the same longitudinal and lateral dimensions as the tone field. Similarly to the previous example, the servo track is pre-recorded longitudinally along the length of tape and, and is wide compared to the written data track width to provide multiple data track index positions across its width. FIGS. 7A and 7B illustrate two exemplary servo tracks and servo frame patterns including erased bands.

The exemplary servo tracks 700A and 700B include repeated servo frames Lf separated by DC erased bands 724. Each servo frame Lf contains a constant flux interval tone, the tone field 710, which provides a metric reference field for distance measurements as described previously. Within tone field 710 of each frame is embedded a synchronization mark 722 that may be distinguished from tone field 710. In one example, the flux space interval of synchronization mark 722 is different than the flux space interval of tone field 710, and the space interval is used to identify the synchronization mark 722 and tone field 710. In other examples, synchronization mark 722 may include numerous flux transitions with various flux space intervals or the like such that synchronization mark 722 may be differentiated from tone field 710.

Figure 8:
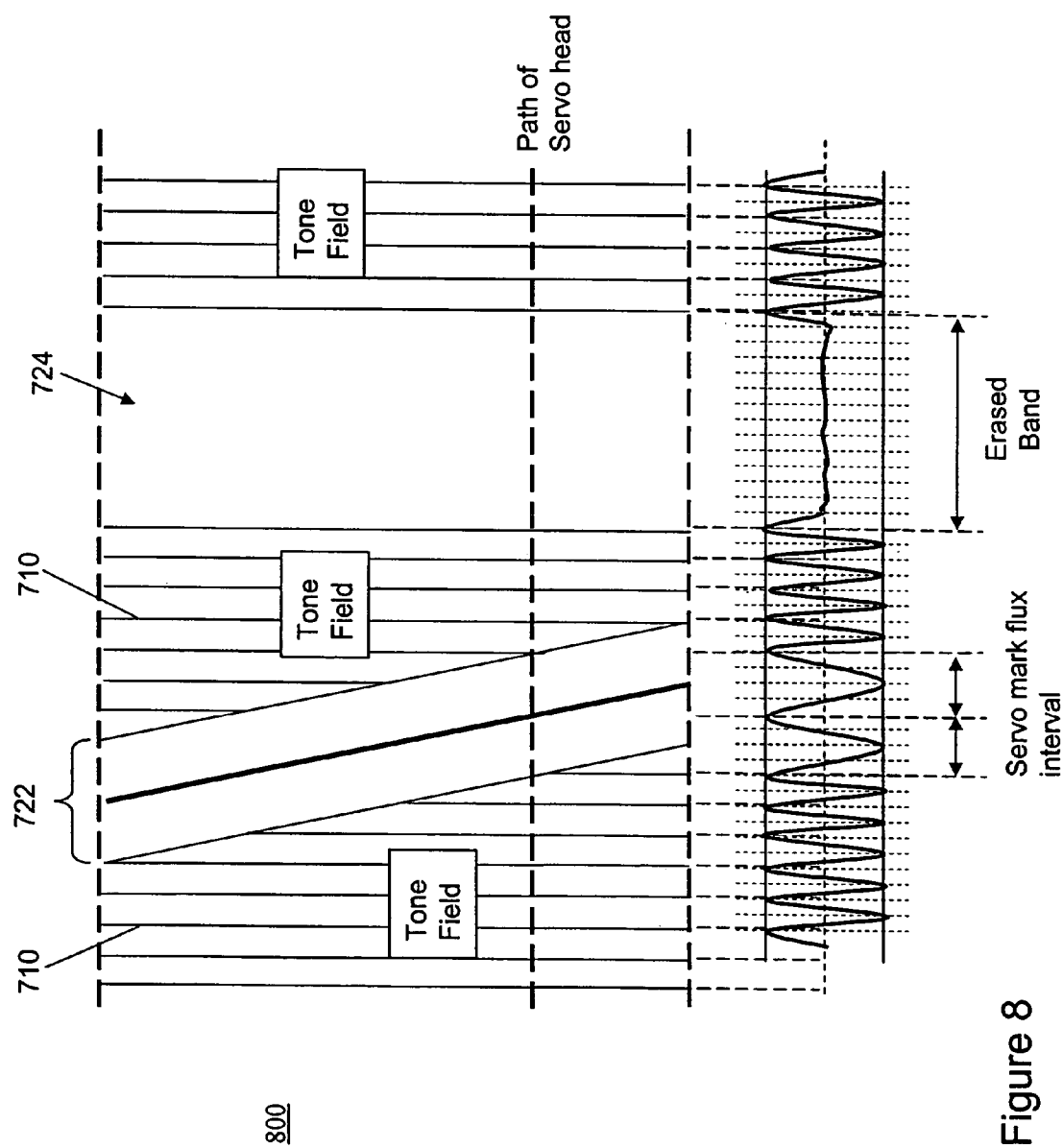
FIG. 8 illustrates an exemplary servo track pattern, read head path, and associated read head signal generated from the servo track.

As the servo read head travels along the servo track, it produces bursts of pulses separated by intervals of no (or relatively flat) signal. FIG. 8 illustrates a path of a narrow read head within servo track 800, which is similar to servo track 700B of FIG. 7B, and the resultant read signal developed in the head shown below. The resultant read signal is similar to that described above, but now includes erased band intervals within the signal marking the start/end of a servo frame. Thus, in this example, erased band 724 and synchronization mark 722 serve as start-frame and mid-frame synchronization marks respectively for servo track 800.

The position signal may be similarly derived from the servo track, and converted to digital pulses by a detection channel. The pulses may be processed by a suitable controller to derive intervals associated with tone field 710, erased band 724, and synchronization mark 722 embedded in tone field 710. In one example, a one-micron interval separates servo marks in tone field 710 and a longer interval of 1.5 microns identifies synchronization mark 722.

When tone field 710, synchronization mark 722, and erased band 724 of the servo track 700 are identified, the computation of lateral position of the servo read head within the servo track may be determined. The position calculations may be similar to those described with reference to FIG. 3.

With continued reference to FIGS. 7A and 7B, servo tracks 700A and 700B, including erased bands 724, are written by a pair of formatted recording heads in one example. The magnetic gaps of the two format heads have different azimuth angles and are positioned longitudinally, one in front of the other, along the length of the tape. The heads are arranged as a first head, which records frames of the reference tone field 710 and separated by DC erased bands 724. A second head, trailing the first head, periodically over-writes the reference tone field 710 with a servo mark 722 recorded at a different azimuth angle and spacing than tone field 710. The two heads create a composite servo track with bursts of reference tone field 710 containing servo marks 722, and separated by DC erased bands 724. The bursts of reference tone field 710 with embedded servo marks 722 form servo frames, which provide a complete set of information for measuring lateral head position as previously described.

Figure 9:
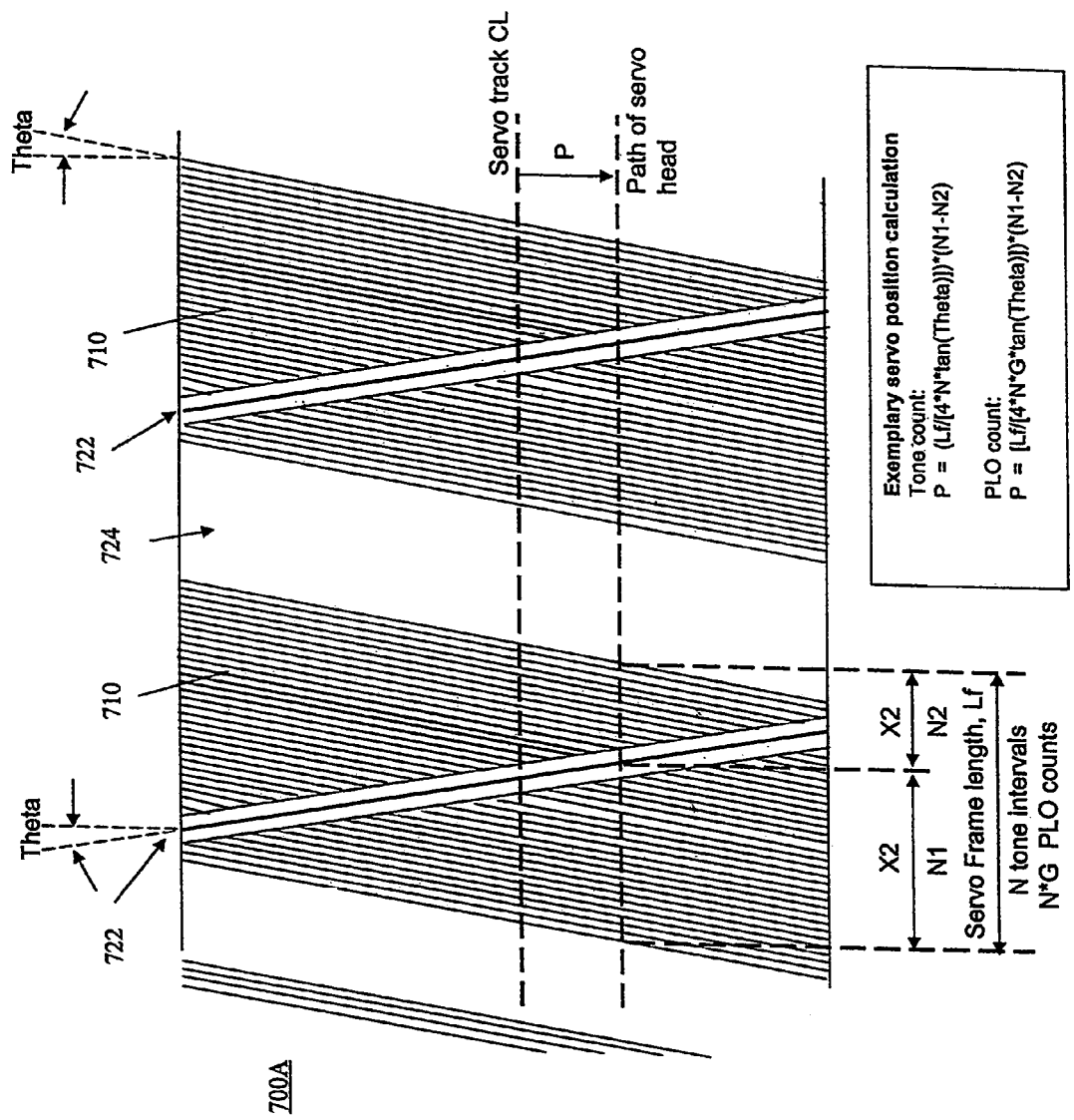
FIG. 9 illustrates an exemplary servo track position calculation form an exemplary servo track pattern.

FIG. 9 illustrates an exemplary method for deriving positional information of a read head. The exemplary method is similar to that described with reference to FIG. 3, accordingly only differences will be discussed. In one example, the lengths of the servo mark and the DC erased band are selected to provide an integral number of tone field intervals, allowing the PLO to transition these regions with no net phase error. Additionally, the phase error of the PLO may be sampled during the intervals when tone is being detected, and held constant during synchronization mark and erase band intervals.

The exemplary servo tracks including erased bands may similarly provide velocity information, include encoded longitudinal information, be arranged in various formats across a storage tape, and the like, similar to the examples without erased bands. Additionally, various other identifiable features may be included within a reference tone or metric field to provide longitudinal position information as described. For example, various combinations of servo marks, erased bands, and other identifiable marks within a reference tone field are possible and contemplated.

The above detailed description is provided to illustrate exemplary embodiments and is not intended to be limiting. It will be apparent to those of ordinary skill in the art that numerous modification and variations within the scope of the present invention are possible. For example, various exemplary methods and systems described herein may be used alone or in combination with various other positional and/or servo methods and systems whether described herein or otherwise including, e.g., optical or magnetic servo methods and systems. Additionally, particular examples have been discussed and how these examples are thought to address certain disadvantages in related art. This discussion is not meant, however, to restrict the various examples to methods and/or systems that actually address or solve the disadvantages.

The invention claimed is:

1. A magnetic storage medium including a longitudinal servo track, the servo track comprising:

magnetic flux transitions forming detectable servo marks, the servo marks forming a tone field of repeating servo marks oriented at a first azimuth angle, whereby the tone field provides a metric reference for dimensional measurements between features of the servo track, wherein the tone field servo marks are phase encoded with information associated with a longitudinal position of the servo track by displacing selective servo marks of the tone field to create longitudinal characters; and servo frames of the tone field having a mid-frame synchronization mark incorporated within the tone field, wherein the mid-frame synchronization mark is distinguishable from the tone field, and for each servo frame the number of servo marks in the tone field of the servo frame along a longitudinal direction of the servo track before the mid-frame synchronization mark and after the mid-frame synchronization mark varies with lateral position of the servo track.

2. The magnetic storage medium of claim 1, wherein the servo frames are separated by a detectable feature.

3. The magnetic storage medium of claim 2, wherein the detectable feature includes an erased band.

4. The magnetic storage medium of claim 2, wherein the detectable feature includes a uniquely identifiable servo mark.

5. The magnetic storage medium of claim 1, wherein the mid-frame synchronization mark has a magnetic flux transition spacing different than the tone field.

6. The magnetic storage medium of claim 1, wherein the mid-frame synchronization mark includes an erased band of the servo track.

7. The magnetic storage medium of claim 1, wherein the mid-frame synchronization mark differs in magnetic flux characteristic and azimuth angle from the tone field of servo marks.

8. The magnetic storage medium of claim 1, wherein the mid-frame synchronization mark is at a second azimuth angle, and the first azimuth angle and the second azimuth angle are equal but opposite to a lateral dimension of the magnetic storage medium.

9. The magnetic storage medium of claim 1, wherein the mid-frame synchronization mark is at a second azimuth angle, and the first azimuth angle and the second azimuth angle are different, but not equal and opposite to the lateral dimension of the magnetic storage medium.

10. The magnetic storage medium of claim 1, wherein the tone field flux transitions and the mid-frame synchronization mark flux transition are at different azimuth angles and occupy simultaneously the same longitudinal and lateral dimension of the servo frame.

11. The magnetic storage medium of claim 1, wherein the tone field servo marks are encoded with information.

12. The magnetic storage medium of claim 11, wherein the information is associated with a longitudinal position of the servo track.

13. The magnetic storage medium of claim 1, further including multiple servo tracks spaced laterally across the magnetic storage medium to define data bands therebetween.

14. The magnetic storage medium of claim 13, wherein the multiple servo tracks are indexed to adjacent data bands.

15. The magnetic storage medium of claim 13, wherein the data bands are defined between the servo tracks.

16. The magnetic storage medium of claim 1, wherein the servo marks of the tone field are disposed having a uniform distance therebetween.

17. A magnetic storage medium including a longitudinal servo track, the servo track comprising:

magnetic flux transitions forming detectable servo marks, the servo marks forming a tone field of repeating servo marks oriented at a first azimuth angle, whereby the tone field provides a metric reference for dimensional measurements between features of the servo track, wherein the tone field servo marks are phase encoded with information associated with a longitudinal position of the servo track by displacing selective servo marks of the tone field to create longitudinal characters.

18. The magnetic storage medium of claim 17, wherein the servo track further includes servo frames of the tone field having a mid-frame synchronization mark incorporated within the tone field, wherein the mid-frame synchronization mark is distinguishable from the tone field, and for each servo frame the number of servo marks in the tone field of the servo frame along a longitudinal direction of the servo track before the mid-frame synchronization mark and after the mid-frame synchronization mark varies with lateral position.

19. The magnetic storage medium of claim 18, wherein the servo frames are separated by a detectable feature.

20. The magnetic storage medium of claim 18, wherein the mid-frame synchronization mark differs in magnetic flux characteristic and azimuth angle from the tone field of servo marks.

21. The magnetic storage medium of claim 18, wherein the mid-frame synchronization mark is at a second azimuth angle, and the first azimuth angle and the second azimuth angle are equal but opposite to a lateral dimension of the magnetic storage medium.

22. The magnetic storage medium of claim 18, wherein the mid-frame synchronization mark is at a second azimuth angle, and the first azimuth angle and the second azimuth angle are different, but not equal and opposite to the lateral dimension of the magnetic storage medium.

23. The magnetic storage medium of claim 17, wherein the information is associated with a longitudinal position of the servo track.

24. A magnetic storage medium including a longitudinal servo track, the servo track comprising:

magnetic flux transitions forming detectable servo marks, the servo marks forming a tone field of repeating servo marks oriented at a first azimuth angle, whereby the tone field provides a metric reference for dimensional measurements between features of the servo track, wherein:

the tone field servo marks are phase encoded with information associated with a longitudinal position of the servo track by displacing selective servo marks of the tone field to create longitudinal characters;

the servo track further includes servo frames of the tone field having a mid-frame synchronization mark at a second azimuth angle incorporated within the tone field, wherein the first azimuth angle and the second azimuth angle different, the mid-frame synchronization mark is distinguishable from the tone field, and for each servo frame the number of servo marks in the tone field of the servo frame along a longitudinal direction of the servo track before the mid-frame synchronization mark and after the mid-frame synchronization mark varies with lateral position of the servo track.

25. The magnetic storage medium of claim 24, wherein the mid-frame synchronization mark is at a second azimuth angle, and the first azimuth angle and the second azimuth angle are equal but opposite to a lateral dimension of the magnetic storage medium.

26. The magnetic storage medium of claim 24, wherein the mid-frame synchronization mark is at a second azimuth angle, and the first azimuth angle and the second azimuth angle are different, but not equal and opposite to the lateral dimension of the magnetic storage medium.

* * * * *